(12) United States Patent
Schwing

(10) Patent No.: US 11,904,929 B2
(45) Date of Patent: Feb. 20, 2024

(54) HEIGHT ADJUSTING DEVICE OF A STEERING COLUMN OF A MOTOR VEHICLE WITH A SPRING ELEMENT

(71) Applicant: NIDEC Motors & Actuators (Germany) GmbH, Bietigheim-Bissingen (DE)

(72) Inventor: Max Schwing, Ludwigsburg (DE)

(73) Assignee: NIDEC MOTORS & ACTUATORS (GERMANY) GMBH, Bietigheim-Bissingen (DE)

( * ) Notice: Subject to any disclaimer, the term of this patent is extended or adjusted under 35 U.S.C. 154(b) by 0 days.

(21) Appl. No.: 17/621,590

(22) PCT Filed: Jun. 19, 2020

(86) PCT No.: PCT/EP2020/067123
§ 371 (c)(1),
(2) Date: Dec. 21, 2021

(87) PCT Pub. No.: WO2020/254590
PCT Pub. Date: Dec. 24, 2020

(65) Prior Publication Data
US 2022/0355850 A1 Nov. 10, 2022

(30) Foreign Application Priority Data
Jun. 21, 2019 (DE) .......................... 102019116761.2

(51) Int. Cl.
*B62D 1/181* (2006.01)
(52) U.S. Cl.
CPC ................... *B62D 1/181* (2013.01)
(58) Field of Classification Search
CPC ............... B62D 1/181; F16H 25/2003
See application file for complete search history.

(56) References Cited

U.S. PATENT DOCUMENTS 4,900,059 A 2/1990 Kinoshita et al.
5,477,744 A * 12/1995 Hoblingre .............. B62D 1/192
74/89.17

(Continued)

FOREIGN PATENT DOCUMENTS

DE 38 55 543 T2 1/1997
DE 202018104386 U1 * 10/2018 ............. B62D 1/181
JP 2015-140124 A 8/2015

OTHER PUBLICATIONS

Official Communication issued in International Patent Application No. PCT/EP2020/067123, dated Dec. 21, 2021.

(Continued)

*Primary Examiner* — Drew J Brown
(74) *Attorney, Agent, or Firm* — Keating & Bennett, LLP

(57) ABSTRACT

A height adjustment device of a steering column of a motor vehicle includes an electric motor and a reduction gear. The electric motor drives a threaded spindle to raise and lower a steering assembly connected to the steering column. The threaded spindle is engaged with a spindle nut, a rotational movement of the threaded spindle is converted into a translational movement of the spindle nut in a direction of a longitudinal axis of the threaded spindle, and the threaded spindle is surrounded on a circumferential side by at least one spring that exerts a spring force on the spindle nut to counteract a weight force of the steering assembly acting in the direction of the axis of rotation of the threaded spindle. The at least one spring includes a compression spring between the reduction gear and the spindle nut and tensioned when the steering assembly is lowered.

10 Claims, 3 Drawing Sheets

(56) References Cited

U.S. PATENT DOCUMENTS

| | | | |
|---|---|---|---|
| 2004/0023746 A1* | 2/2004 | Arihara | B62D 1/181 |
| | | | 475/281 |
| 2009/0066070 A1* | 3/2009 | Ueno | B62D 1/195 |
| | | | 280/775 |
| 2013/0255430 A1* | 10/2013 | Moriyama | B62D 1/197 |
| | | | 74/493 |
| 2015/0061271 A1 | 3/2015 | Morinaga et al. | |

OTHER PUBLICATIONS

English translation of Official Communication issued in International Patent Application No. PCT/EP2020/067123, dated Sep. 25, 2020.

Official Communication issued in International Patent Application No. PCT/EP2020/067123, dated Sep. 25, 2020.

* cited by examiner

HEIGHT ADJUSTING DEVICE OF A STEERING COLUMN OF A MOTOR VEHICLE WITH A SPRING ELEMENT

CROSS REFERENCE TO RELATED APPLICATIONS

This is a U.S. national stage of PCT Application No. PCT/EP2020/067123, filed on Jun. 19, 2020, with priority under 35 U.S.C. § 119(a) and 35 U.S.C. § 365(b) being claimed from German Application No. 10 2019 116 761.2, filed on Jun. 21, 2019, the entire disclosures of which are hereby incorporated herein by reference.

1. Field of the Invention

The present disclosure relates to a height adjustment device of a steering column of a motor vehicle, and to a steering column.

2. Background

Steering columns for motor vehicles are known in many different designs. Steering columns in which a steering shaft is rotatably mounted in a jacket tube are generally used. The jacket tube itself is mounted in a box-type rocker arm so that it can be adjusted axially. The box-type rocker arm is in turn pivotably mounted on a bracket to be attached to the vehicle in order to enable height adjustment of the steering wheel.

When adjusting the height of the steering wheel, the weight force causes a counterforce when raising and a corresponding thrust force when lowering. This leads to different adjustment speeds and noises when moving the steering wheel, which is annoying for the driver of the motor vehicle.

From the disclosure of document US 2015/0061271 A1, a steering column with height adjustment device is known which supports the weight force of the steering wheel by a helical spring arranged on a box-type rocker arm and thus minimizes a relative load on the height adjustment device due to the weight force. The spring elements take up a large amount of installation space.

SUMMARY

Example embodiments of the present disclosure provide an electrically adjustable steering column which has a nearly uniform adjustment speed independent of the height adjustment direction.

An example embodiment of the present disclosure provides a height adjustment device of a steering column of a motor vehicle including an electric motor and a reduction gear. The electric motor drives a threaded spindle to raise and lower a steering assembly connected to the steering column in a height adjustment direction. The threaded spindle is engaged with a spindle nut. A rotational movement of the threaded spindle is converted into a translational movement of the spindle nut in a direction of the longitudinal axis of the threaded spindle. The threaded spindle is surrounded on the circumferential side by at least one spring. The at least one spring exerts a spring force on the spindle nut which counteracts a weight force acting in the direction of the axis of rotation of the threaded spindle, in particular of the steering assembly. The at least one spring includes a compression spring, which is between the reduction gear and the spindle nut and is tensioned when the steering assembly is lowered. The compression spring preferably has a linear spring characteristic.

Due to the arrangement of the at least one spring on the threaded spindle, the spring force is significantly lower compared to the arrangement known from the prior art, whereby costs can be saved. In addition, the spring weight is lower, since the at least one spring can be smaller and lighter. Furthermore, the installation space around the threaded spindle is optimally used and the steering column installation space remains. In most cases, the vector of the weight force does not point in the direction of the axis of rotation of the threaded spindle. In this case, there is only one vector component pointing in this direction, which is then the weight force acting in the direction of the axis of rotation of the threaded spindle.

The spring force of the at least one spring is preferably dimensioned such that a permanent one-sided load on the spindle nut can be prevented.

In an advantageous example embodiment of the present disclosure, only a single spring is used as the at least one spring. However, it is also conceivable to use several springs to map a desired spring characteristic.

Preferably, the at least one spring is a coil spring, in particular made of steel.

Preferably, the coil spring has a coil axis that is identical to the axis of rotation of the threaded spindle.

Advantageously, the compression spring exerts a preloading force on the spindle nut in an end position of the spindle nut on the threaded spindle remote from the reduction gear. This can prevent the arrangement from rattling.

Preferably, at least one spring in the assembled height adjustment device applies a spring force in a range between 40N and 100N. Particularly preferably, the spring force in the upper end position is in a range between 20N and 50N, preferably about 40N, and in the lower end position is in a range between 80N and 120N, preferably about 100N.

In an advantageous embodiment, the at least one spring has a spring characteristic such that, at least at the midpoint between the two end stops of the spindle nut on the threaded spindle, the weight force acting in the direction of the axis of rotation of the threaded spindle is compensated.

Furthermore, a steering column of a motor vehicle according to an example embodiment of the present disclosure is provided with a height adjustment device described above.

Preferably, the steering column includes a steering shaft which is rotatably mounted in a jacket tube. The jacket tube itself is axially adjustably mounted in a guide bracket which is pivotably mounted about a pivot axis in a holding portion which can be connected to a body of the motor vehicle. The height adjustment device pivots the guide bracket relative to the holding portion in order to raise and lower the steering assembly. In this respect, it is advantageous if a lever is pivotably held in a pivot axis on the holding portion and in a pivot axis on the guide bracket, and the electric motor effects pivoting of the guide bracket by the lever. Preferably, the spindle nut is connected to the lever to pivot the guide clamp.

In this case, the weight force is provided by the adjustable steering column components and the steering assembly. The steering column components are in particular the guide bracket and the jacket tube.

In an event that the lever transmission ratio of the lever changes along the adjustment path, it is advantageous if the spring characteristic of the at least one spring is matched to the change, caused by the lever, in the weight force acting on the spindle nut in the direction of the axis of rotation of the threaded spindle. In this respect, it is preferably provided that the spring force of the at least one spring is almost identical in magnitude to the weight force acting in the direction of the axis of rotation of the threaded spindle over a predominant part of the travel of the height adjustment device. However, it may also be provided that the spring compensates for the weight force to a predominant extent along the entire adjustment path, in both directions. The resulting constant speed results in a constant sound pattern, which is perceived as pleasant by the driver.

The above and other elements, features, steps, characteristics and advantages of the present disclosure will become more apparent from the following detailed description of the example embodiments with reference to the attached drawings.

BRIEF DESCRIPTION OF THE DRAWINGS

In the following, an example embodiment of the present disclosure will be described with reference to the drawings. Identical or comparable components in different drawings bear the same reference numerals. They show.

DETAILED DESCRIPTION

Figure 1:
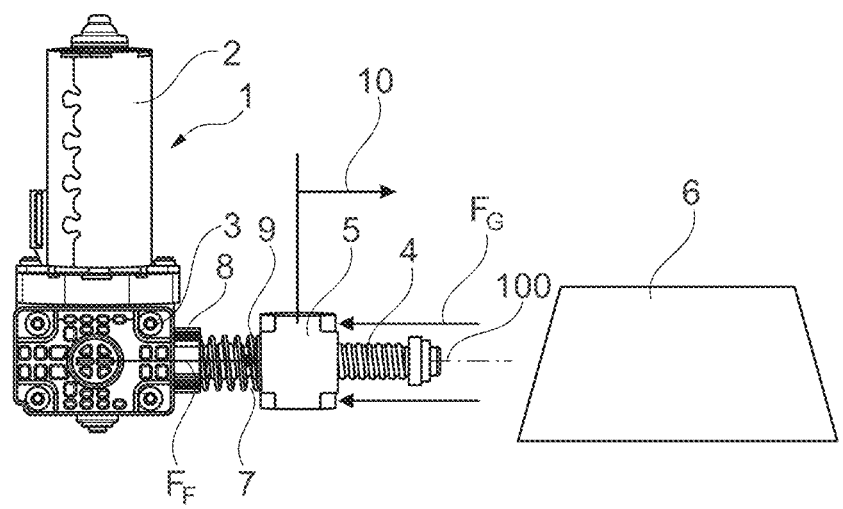
FIG. 1 is a schematic representation of a portion of a height adjustment device of a steering column according to an example embodiment of the present disclosure when the steering wheel is raised.
Figure 2:
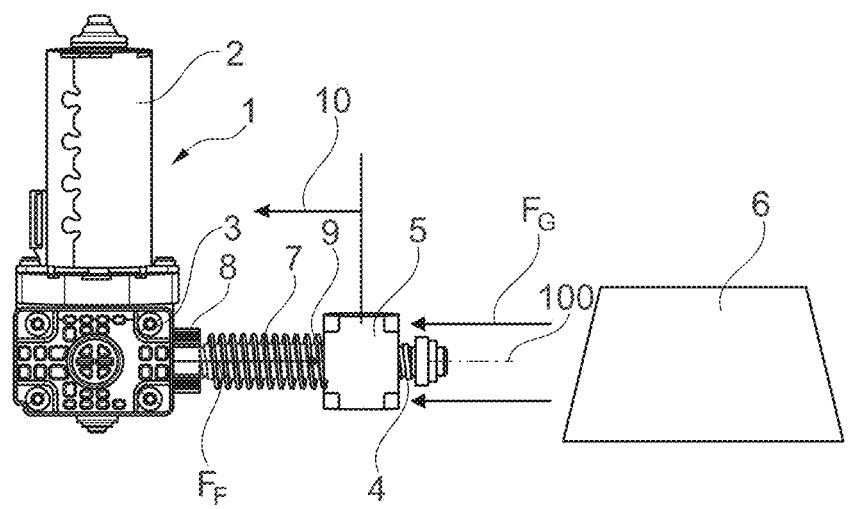
FIG. 2 is a schematic representation of the portion of the height adjustment device of FIG. 1 when the steering wheel is lowered.

FIGS. 1 and 2 show a spatial representation of an actuator 1 with an electric motor 2 and a reduction gear 3 of a height adjustment device of a steering column. The electric motor 2 drives, via the reduction gear 3, a threaded spindle 4 which is engaged with a spindle nut 5. The spindle nut 5 is moved on the threaded spindle 4 along a longitudinal axis 100 by the electric motor 2, wherein the interaction of the threaded spindle 4 and the spindle nut 5 converts the rotational movement of the threaded spindle 4 into a translational movement of the spindle nut 5 in the direction of the longitudinal axis 100 of the threaded spindle 4. The spindle nut 5 is indirectly connected to a steering assembly not shown, in particular a steering wheel, so that a movement of the spindle nut 5 along the longitudinal axis 100 of the threaded spindle 4 results in a height adjustment of the steering wheel. In an example embodiment, a steering shaft connected to the steering wheel is rotatably mounted in a jacket tube. The jacket tube is slidably guided in a guide clamp along the longitudinal axis of the steering shaft. The guide clamp is pivotally mounted about a pivot axis in a bracket or, more generally, a retaining member. The retaining member may be secured in mounting points on a body of a motor vehicle. The spindle nut is connected to the guide bracket, which in turn is connected to the holding portion by a lever, so that movement of the spindle nut along the longitudinal axis of the threaded spindle leads to pivoting of the guide bracket relative to the holding portion and to adjustment of the steering wheel in the height adjustment direction. In the two figures, the weight 6 acting on the height adjustment device or the spindle nut is shown purely schematically. The threaded spindle 4 is at least partially surrounded by a spring 7. The spring 7 is a helical spring with a helical axis. The coils of the helical spring 7 surround the threaded spindle 4 on the circumferential side and the helical axis is preferably identical to the axis of rotation of the threaded spindle 100. The helical spring 7 is supported at one end, in the direction of the helical spring axis, on a housing 8 of the transmission 3 and at the other end on an end face 9, close to the housing, of the spindle nut 5. The spring 7 is a compression spring which is tensioned when the steering wheel is lowered in order to counteract the weight force of the steering wheel.

FIG. 1 shows the actuator 1 and illustrates the lifting of the steering wheel. The direction of adjustment of the spindle nut 10 is indicated schematically by an arrow. The weight force of the steering wheel and the adjustable steering column components, in particular the guide bracket and the jacket tube, counteracts with its vector component $F_G$ the force applied by the electric motor for height adjustment and the spring force $F_F$. The spring is relieved by this movement, whereby the spring force $F_F$ of the spring at least partially compensates for the load on the spindle nut 5.

FIG. 2 shows the lowering of the steering wheel. The weight force of the steering wheel and the steering column components with their vector component $F_G$ supports the electric motor during the height adjustment. In other words, the electric motor has to apply less torque to achieve the same adjustment speed as during lifting. The spring is thereby tensioned, increasing the spring force $F_F$ of the spring and increasing the load on the electric motor 2.

The spring force of the spring $F_F$ is dimensioned such that a permanent one-sided load on the spindle nut 5 can be prevented. Preferably, the spring 7 has a linear spring characteristic. Preferably, the spring constant is thereby selected such that the weight force $F_G$ acting on the spindle nut 5 in the middle between the two end positions of the spindle nut 5 on the threaded spindle 4, which correspond to the end positions of the height adjustment of the steering wheel, is compensated by the spring force.

Figure 3:
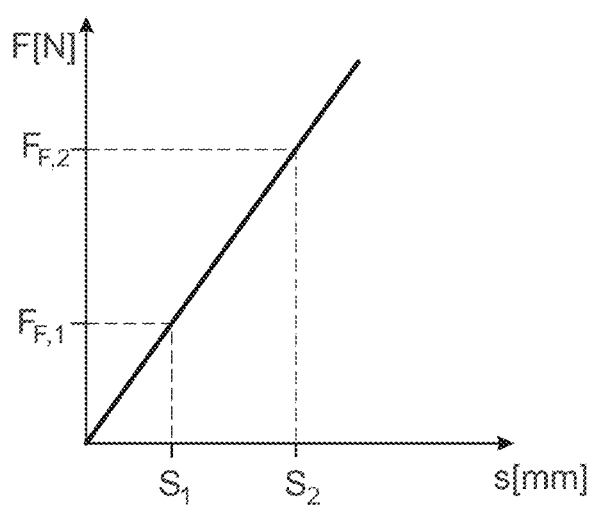
FIG. 3 is a load characteristic of a spring element of the height adjustment device.

FIG. 3 shows a preferred spring characteristic of a compression spring in the arrangement described above. In the uppermost position of the height adjustment device or the end position of the spindle nut $s_1$ on the threaded spindle remote from the actuator, the compression spring is preloaded with a force $F_{F,1}$. When the height adjustment device is moved to the lower position $s_2$, i.e. when the steering wheel is lowered, the compression spring is tensioned. The spring force increases linearly up to a value $F_{F,2}$.

In the example shown in FIG. 3, the spring constant is adapted to a variation of the weight force along the adjustment path. This change in the weight force acting on the spindle nut in the direction of the axis of rotation of the threaded spindle is brought about by a lever which, as described above, is preferably arranged between the guide clamp and the retaining part. The changing lever ratio is preferably in a range between 1.3 and 1.6. Preferably, the spring compensates the weight force to a predominant part along the whole adjustment path, in both directions. For an approximate weight of 4 kg of the steering wheel, the spring force $F_F$ is preferably between 40N and 100N in the assembled state of the height adjustment device. In the example shown in FIG. 3, the spring force in the upper end position $F_{F,1}$ is in a range between 20N and 50N, preferably about 40N and the spring force in the lower end position $F_{F,2}$ is in a range between 80N and 120N, preferably about 100N.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A height adjustment device of a steering column of a motor vehicle, the height adjustment device comprising:
an electric motor; and
a reduction gear; wherein
the electric motor drives a threaded spindle to raise and lower a steering assembly connected to the steering column;
the threaded spindle is engaged with a spindle nut;
a rotational movement of the threaded spindle is converted into a translational movement of the spindle nut in a direction of a longitudinal axis of the threaded spindle;
the threaded spindle is surrounded on a circumferential side by at least one spring that is capable of exerting a spring force on the spindle nut to counteract a weight force acting in the direction of the longitudinal axis of the threaded spindle; and
the at least one spring including a compression spring which is between the reduction gear and the spindle nut and is tensioned when the steering assembly is lowered.

2. The height adjustment device according to claim 1, wherein the at least one spring includes a helical spring.

3. The height adjustment device according to claim 1, wherein the compression spring has a linear spring characteristic.

4. The height adjustment device according to claim 2, wherein the helical spring includes a helical axis which is identical to the longitudinal axis of the threaded spindle.

5. The height adjustment device according to claim 1, wherein the compression spring exerts a preloading force on the spindle nut in an end position of the spindle nut on the threaded spindle which is spaced away from the reduction gear.

6. The height adjustment device according to claim 1, wherein the at least one spring applies the spring force in a range from about 40N to about 100N when the height adjustment device is assembled.

7. The height adjustment device according to claim 1, wherein the at least one spring has a spring characteristic such that, at least at a midpoint between the two end stops of the spindle nut on the threaded spindle, the weight force acting in the direction of the axis of rotation of the threaded spindle is compensated.

8. A steering column of a motor vehicle including the height adjustment device according to claim 1.

9. The steering column according to claim 1, wherein the spring characteristic of the at least one spring is matched to a change in a weight force acting on the spindle nut in the direction of the longitudinal axis of the threaded spindle.

10. The steering column according to claim 9, wherein the spring force of the at least one spring is identical or substantially identical in magnitude to the weight force acting in the direction of the longitudinal axis of the threaded spindle over a predominant portion of travel of the height adjustment device.

* * * * *